US012641673B2

(12) United States Patent
Krishnamoorthy et al.

(10) Patent No.: US 12,641,673 B2
(45) Date of Patent: May 26, 2026

(54) USER EQUIPMENT POWER SAVING ALGORITHM FOR DISCONTINUOUS RECEPTION SCENARIOS

(71) Applicant: QUALCOMM Incorporated, San Diego, CA (US)

(72) Inventors: Parthasarathy Krishnamoorthy, San Diego, CA (US); Syam Pavan Vadapalli, Visakhapatnam (IN); Karthik Pavan Krishna Bhogaraju, San Diego, CA (US); Swarupa Gandhi Vudata, Hyderabad (IN); Sudheer Kumar Reddy Vangala, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 311 days.

(21) Appl. No.: 17/702,616

(22) Filed: Mar. 23, 2022

(65) Prior Publication Data

US 2023/0309182 A1     Sep. 28, 2023

(51) Int. Cl.
*H04W 76/28* (2018.01)
*H04W 72/0446* (2023.01)

(52) U.S. Cl.
CPC ....... *H04W 76/28* (2018.02); *H04W 72/0446* (2013.01)

(58) Field of Classification Search
CPC ......... H04W 52/0216; H04W 52/0258; H04W 68/02; H04W 72/0446; H04W 76/28; H04W 88/06; Y02D 30/70
See application file for complete search history.

(56) References Cited

U.S. PATENT DOCUMENTS

| | | | | |
|---|---|---|---|---|
| 9,179,407 B2* | 11/2015 | Donthi | ................... | H04W 76/28 |
| 2013/0242832 A1* | 9/2013 | Koc | ........................ | H04W 24/02 |
| | | | | 370/311 |
| 2015/0195782 A1* | 7/2015 | Terry | ..................... | H04W 76/28 |
| | | | | 370/311 |
| 2015/0271868 A1* | 9/2015 | Rune | ........................ | H04W 4/70 |
| | | | | 370/311 |
| 2015/0319643 A1* | 11/2015 | Zhu | ................... | H04W 72/0446 |
| | | | | 370/336 |
| 2016/0073284 A1* | 3/2016 | Qian | ................. | H04W 52/0229 |
| | | | | 370/241 |

(Continued)

OTHER PUBLICATIONS

International Search Report and Written Opinion—PCT/US2023/063462—ISA/EPO—Jun. 5, 2023.

(Continued)

*Primary Examiner* — Stephen J Clawson
(74) *Attorney, Agent, or Firm* — Patterson & Sheridan, LLP

(57) ABSTRACT

Certain aspects of the present disclosure provide techniques for enhancing a UE power savings mode. Certain aspects provide a method for wireless communication by a user equipment (UE) generally including receiving, from a network entity, signaling configuring the UE with discontinuous reception (DRX) parameters for a DRX mode, the DRX parameters including a DRX periodicity and DRX slot offset that define DRX off durations and transmitting, to the network entity, a request to modify the DRX slot offset after detecting at least one condition based on the DRX parameters.

24 Claims, 12 Drawing Sheets

(56) References Cited

U.S. PATENT DOCUMENTS

| | | | | |
|---|---|---|---|---|
| 2016/0366645 | A1* | 12/2016 | Song | H04W 52/0229 |
| 2018/0092158 | A1* | 3/2018 | Lee | H04L 65/40 |
| 2019/0053158 | A1* | 2/2019 | Kumar | H04W 52/0229 |
| 2019/0098689 | A1* | 3/2019 | Wei | H04W 76/28 |
| 2019/0327673 | A1* | 10/2019 | Bitra | G01S 5/10 |
| 2020/0186991 | A1* | 6/2020 | He | H04L 5/1469 |
| 2020/0413475 | A1* | 12/2020 | Wei | H04W 76/28 |
| 2021/0227619 | A1* | 7/2021 | Balasubramanian | |
| | | | | H04W 76/28 |
| 2021/0267008 | A1* | 8/2021 | Dutta | H04W 76/28 |
| 2021/0281999 | A1* | 9/2021 | Cui | H04W 88/06 |
| 2021/0329720 | A1* | 10/2021 | Balasubramanian | |
| | | | | H04W 76/14 |
| 2021/0337471 | A1 | 10/2021 | Hu et al. | |
| 2021/0410107 | A1* | 12/2021 | Park | H04W 76/27 |
| 2022/0007285 | A1* | 1/2022 | Terry | H04W 52/0212 |
| 2022/0338118 | A1* | 10/2022 | Jang | H04B 7/0626 |
| 2023/0127560 | A1* | 4/2023 | Li | H04W 76/23 |
| | | | | 370/329 |
| 2023/0217463 | A1* | 7/2023 | Hui | H04W 72/25 |
| | | | | 370/329 |
| 2023/0217468 | A1* | 7/2023 | Hui | H04W 72/25 |
| | | | | 370/329 |
| 2023/0269821 | A1* | 8/2023 | Ranjan | H04W 76/28 |
| | | | | 370/329 |
| 2023/0318680 | A1* | 10/2023 | Zhou | H04B 7/0695 |
| | | | | 370/329 |
| 2024/0357704 | A1* | 10/2024 | Pradas | H04W 76/28 |
| 2025/0105963 | A1* | 3/2025 | Shreevastav | H04W 64/006 |

OTHER PUBLICATIONS

Zte Corporation, et al., "Further Consideration on Sl Drx Configuration", 3GPP TSG-RAN WG2 Meeting #115 Electronic, R2-2107433, 3rd Generation Partnership Project (3GPP), Mobile Competence Centre, 650, Route Des Lucioles, F-06921 Sophia-Antipolis Cedex, France, vol. RAN WG2, No. electronic, Aug. 16, 2021-Aug. 27, 2021, 8 Pages, Aug. 6, 2021 (Aug. 6, 2021), XP052034134, pp. 2-8.

* cited by examiner

600

```
┌─────────────────┐                    ┌─────────────────┐
│        UE       │                    │  Network Entity │
└─────────────────┘                    └─────────────────┘
         │                                      │
         │◄──────────DRX Configuration──────────│
         │                                      │
┌─────────────────────────────────┐            │
│ Detect at least one condition based         │
│ on the DRX parameters (e.g., TRS            │
│ falls in DRX Off Duration)                  │
└─────────────────────────────────┘            │
         │                                      │
         │────Request to Modify────────────────►│
         │      DRX Slot Offset                 │
         │                                      │
         │◄────────Response─────────────────────│
         │      (Granting Request)              │
         │                                      │
┌─────────────────────────────────┐            │
│     Update DRX Slot Offset      │            │
└─────────────────────────────────┘            │
         │                                      │
```

*FIG. 6*

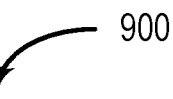

A method of wireless communication by a user equipment

Receiving, from a network entity, signaling configuring the UE with DRX parameters for a DRX mode, the DRX parameters including a DRX periodicity and DRX slot offset that define DRX off durations

905

Transmitting, to the network entity, a request to modify the DRX slot offset after detecting at least one condition based on the DRX parameters

A method of wireless communication by a network entity

Transmitting, to a UE, signaling configuring the UE with DRX parameters for a DRX mode, the DRX parameters including a DRX periodicity and DRX slot offset that define DRX off durations

1005

Receiving, from the UE, a request to modify the DRX slot offset

1010

USER EQUIPMENT POWER SAVING ALGORITHM FOR DISCONTINUOUS RECEPTION SCENARIOS

INTRODUCTION

Aspects of the present disclosure relate to wireless communications, and more particularly, to techniques for saving power when a user equipment (UE) is in a discontinuous reception (DRX) mode.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE), including receiving, from a network entity, signaling configuring the UE with discontinuous reception (DRX) parameters for a DRX mode, the DRX parameters including a DRX periodicity and DRX slot offset that define DRX off durations; and transmitting, to the network entity, a request to modify the DRX slot offset after detecting at least one condition based on the DRX parameters.

One aspect provides a method of wireless communication by a network entity, including transmitting, to a UE, signaling configuring the UE with DRX parameters for a DRX mode, the DRX parameters including a DRX periodicity and DRX slot offset that define DRX off durations; and receiving, from the UE, a request to modify the DRX slot offset.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 6 depicts an example call flow diagram for negotiating DRX parameters, in accordance with aspects of the present disclosure.

FIGS. 9 and 10 depict example processes of wireless communication according to aspects of the present disclosure.

DETAILED DESCRIPTION

Aspects of the present disclosure relate to wireless communications, and more particularly, to techniques for saving power when a user equipment (UE) is in a discontinuous reception (DRX) mode.

To reduce power consumption, a user equipment (UE) may be configured for discontinuous reception (DRX) operations. In some systems (e.g., NR), there are two types of DRX, Idle mode DRX and Connected mode DRX (CDRX). In both Idle mode DRX and CDRX, the UE powers down certain components during inactive or Off-durations. In Idle mode DRX, the UE periodically wakes up to monitor for paging messages and goes back to sleep mode if paging message is not intended for it. In CDRX, the UE wakes up during On-durations the UE monitors for physical downlink shared channel (PDSCH) activity with a given periodicity, receives downlink data, transmits uplink data, and/or makes serving cell or neighbor measurements.

The network typically configures UE with a set of CDRX parameters that are selected based on the application type, in an effort to optimize power and resource savings. When C-DRX is enabled, the UE battery power consumption is reduced but this will increase latency because there may be an extended delay in receiving data if the UE is in a sleep state (during an Off-duration) at the time of data arrival at the network as the network waits for the UE to becomes active.

In typical scenarios, the network configures CDRX and the related set of parameters are sent to the UE via radio resource control (RRC) signaling. For example, the network can configure start of the 'On Duration' within a subframe. The parameter drx-SlotOffset defines the start of the 'On Duration' relative to the start of a subframe boundary. There are various scenarios where a UE might want to renegotiate the 'drx-SlotOffset' for better performance or good power savings. For example, if the UE is configured to measure certain downlink reference signals and those reference signals fall within a configured Off-Duration of a CDRX mode, the UE may have to exit the Off-Duration prematurely (or extend an On-Duration) in order to perform the measurement.

Aspects of the present disclosure, however, provide signaling mechanisms that may allow a UE to effectively negotiate parameters such as the drx-SlotOffset that might help align the CDRX On-duration with the downlink reference signal. As a result, the UE may not need to exit CDRX Off-duration prematurely to perform the measurement and UE power savings may be improved.

Introduction to Wireless Communication Networks

Figure 1:
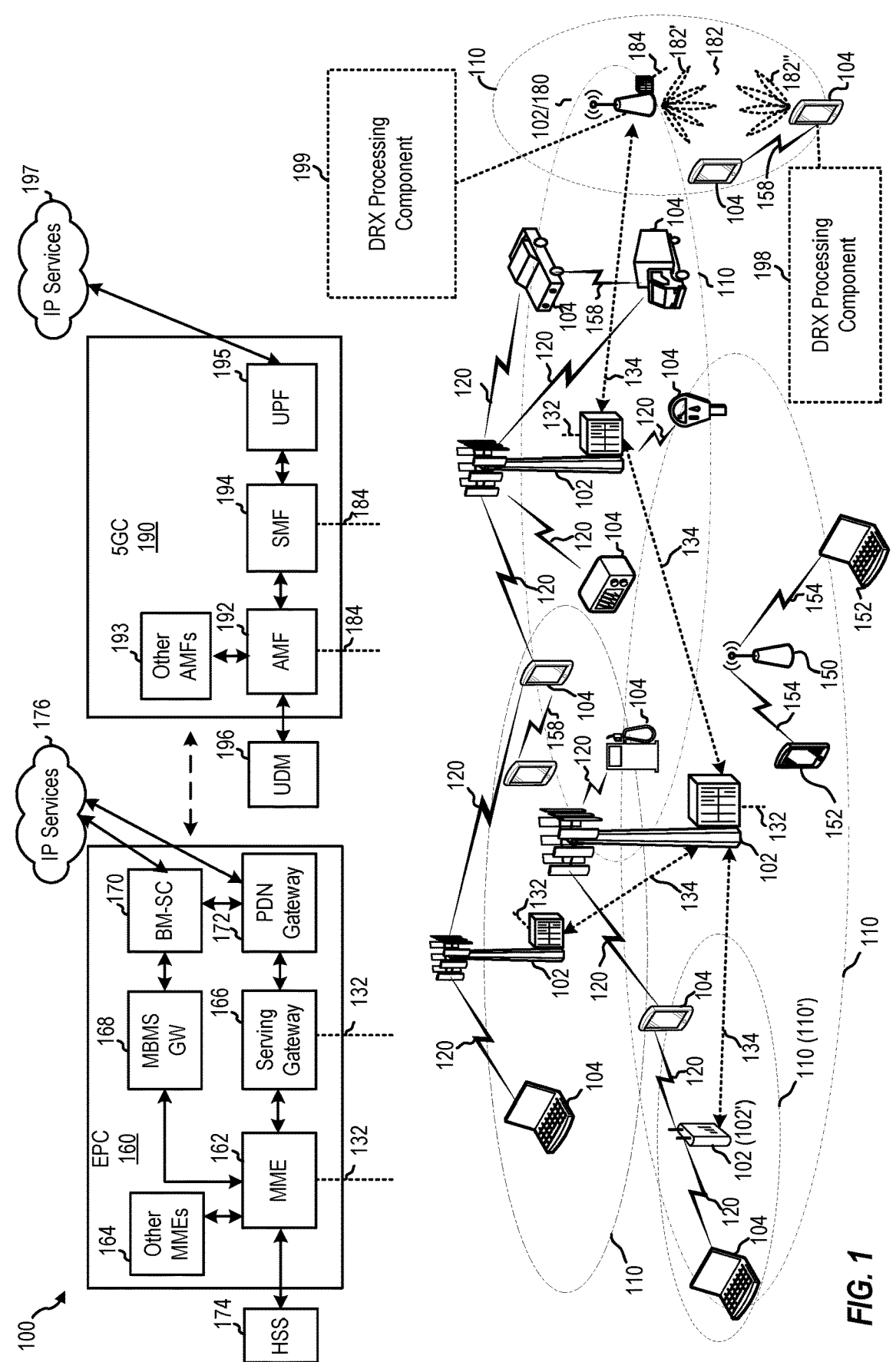
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components (also referred to as network entities) that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes DRX processing component 199, which may configure one or more aspects of DRX parameters for UE 104 DRX modes. Wireless communication network 100 further includes DRX processing component 198, which may be used to request modification to DRX configurations.

Figure 2:
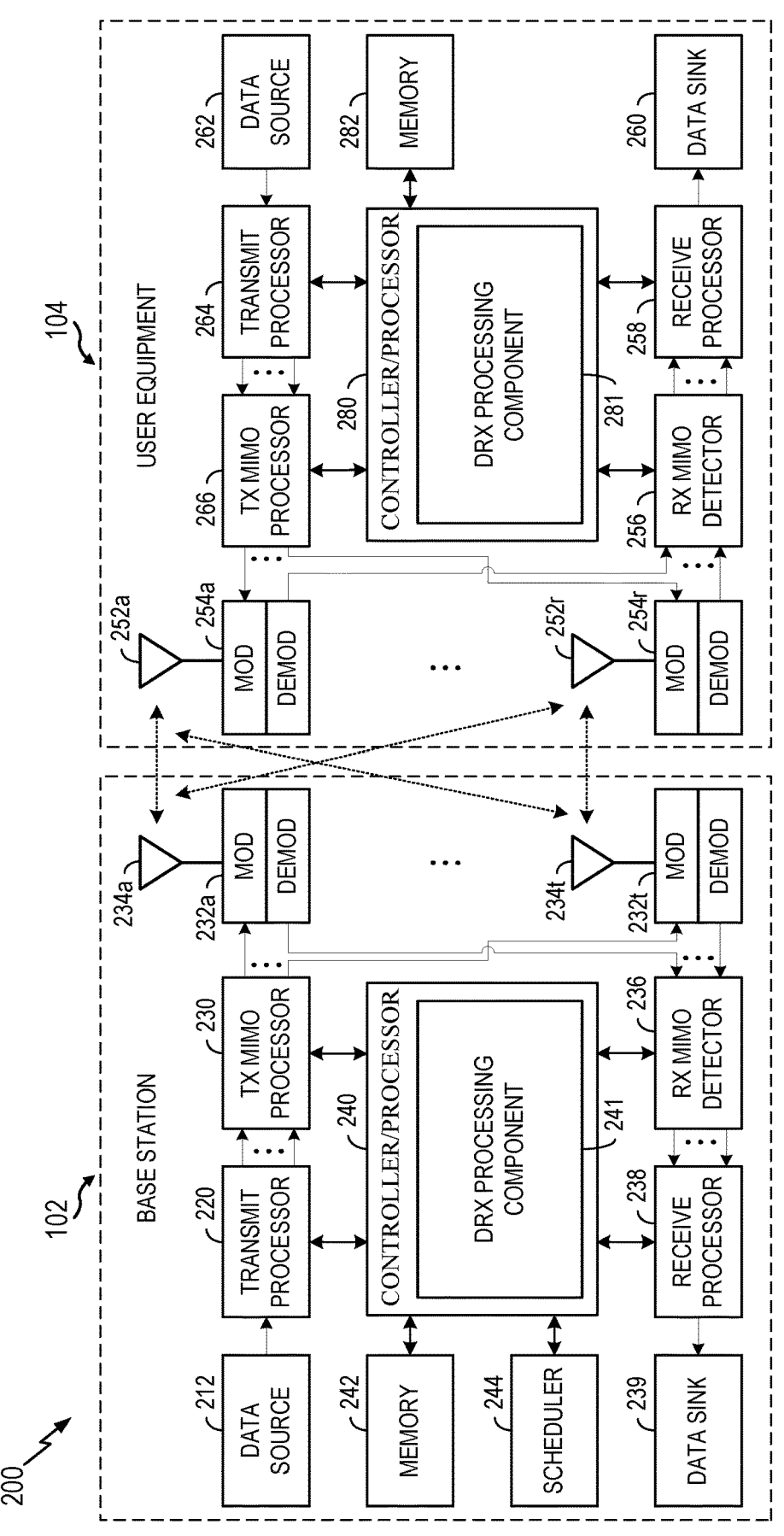
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes DRX processing component 241, which may be representative of DRX processing component 199 of FIG. 1. Notably, while depicted as an aspect of controller/processor 240, DRX processing component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes DRX processing component 281, which may be representative of DRX processing component 198 of FIG. 1. Notably, while depicted as an aspect of controller/processor 280, DRX processing component 281 may be implemented additionally or alternatively in various other aspects of UE 104 in other implementations.

Figures 3A, 3B, 3C, 3D:
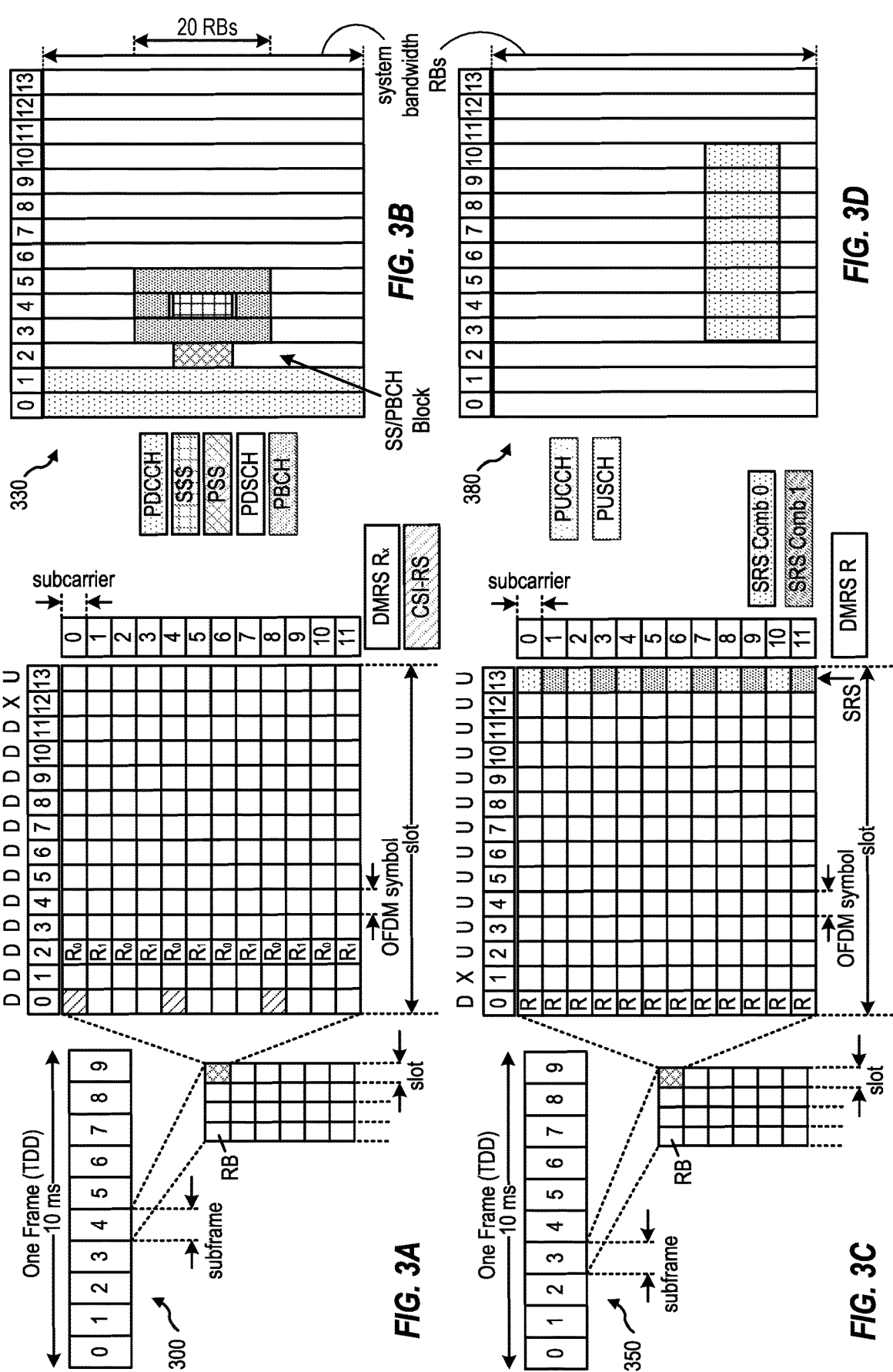
FIGS. 3A, 3B, 3C, and 3D depict various example aspects of data structures for a wireless communication network.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Overview of Tracking Reference Signals (TRS)

When connecting to and communicating with a wireless communication network, such as the wireless communication system 100, a user equipment (UE) may need to perform one or more synchronization procedures with the wireless communication to correct for timing errors, allowing the UE to properly receive transmissions from the wireless communication network. In particular, certain aspects provide techniques for frequency tracking and timing tracking using wideband reference signals (RSs).

Figure 4:
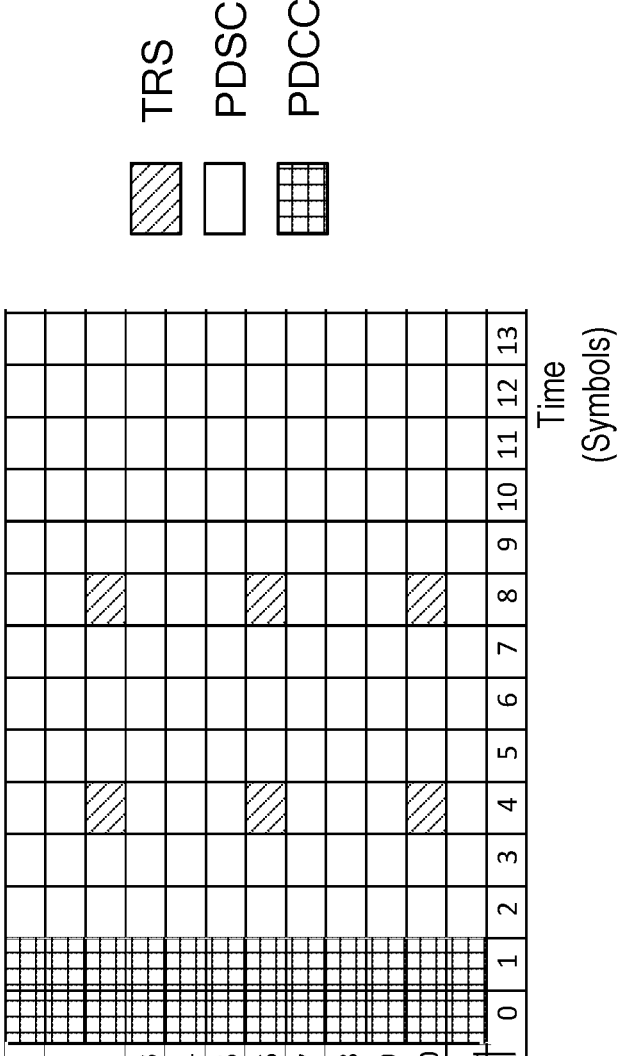
FIG. 4 depicts an example resource allocation for tracking reference signals (TRS).

FIG. 4 shows a time-frequency resource grid 400, illustrating the allocation of resources for TRSs. As shown, time (in terms of symbols) is depicted along the horizontal axis while frequency (in terms of subcarriers) is depicted along the vertical axis. The time-frequency resource grid 400 illustrated in FIG. 4 may represent one resource block (RB), consisting of 12 subcarriers and one slot (e.g., including 12 to 14 symbols per slot) as described with respect to FIG. 3A. As shown, the time-frequency resource grid 400 includes resources for physical downlink control channel (PDCCH) transmissions, physical downlink shared channel (PDSCH) transmissions, and TRS in this example.

TRSs are a special type of channel state information reference signal (CSI-RS). For example, TRSs may include a resource set of multiple periodic CSI-RS. In typical configurations, TRSs may be transmitted in two adjacent slots and within two symbols within each slot. For example, as illustrated in FIG. 4, TRSs may be transmitted within symbols 4 and 8 of the time-frequency resource grid 400, having a symbol spacing of four ($\Delta n_{TRS}=4$). Further, as depicted, TRSs may have a subcarrier spacing (SCS) of four subcarriers measured from the centers of the TRS REs (e.g., $\Delta k_{TRS}=4$), resulting in a TRS density within a resource block (e.g., that only includes 12 subcarriers) of three resource elements. In other words, as depicted in FIG. 4, due to $\Delta k_{TRS}=4$, three TRS may be transmitted within a resource block.

Additionally, TRSs may have a symbol spacing within a slot ($\Delta n_{TRS}$) of four symbols (e.g., $\Delta n_{TRS}=4$ symbols). In some cases, the symbol positions for the TRSs may be configured by radio resource control (RRC) signaling and may be one of several options. For example, as shown in FIG. 4, TRS may be located in symbols 4 and 8. In other cases, TRS may be located in symbols 5 and 9. In yet other cases, TRS may be located in symbols 6 and 10.

Overview of Idle Mode/Discontinuous Reception (DRX)

As noted above, Discontinuous Reception (DRX) is one mechanism in NR to reduce UE power consumption and extend battery life. In a DRX mode, the UE periodically enters a 'sleep' state (DRX Off duration) during which RF components may be powered down as PDCCH need not be monitored. In order to monitor PDCCH for possible downlink/uplink data, the UE is configured to wake up periodically and stay 'awake' (DRX On duration) for a certain amount of time before going to 'sleep' again. As illustrated, one DRX On duration and one DRX Off duration occurs in a DRX cycle (according to a configured DRX periodicity).

In addition to reducing UE power consumption, DRX is also beneficial from the network standpoint in terms of scheduling flexibility and resource allocation. When a UE is not in DRX mode, a UE performs certain functions that consume resources. While the UE is in DRX mode, the gNB can assign these resources to other UEs to optimize resource utilization.

A base station (e.g., gNB) configures a UE with a set of DRX parameters, typically selected to optimize power consumption while allowing the UE to be reachable without too much delay. In other words, when DRX is enabled, the UE battery power consumption is reduced but at the cost of increase latency. This is because, there might be an extended delay in receiving data as, the UE may be in DRX Sleep state at the time of data arrival at the gNB, meaning the gNodeB would have to wait until the UE becomes active in a subsequent. The latency increases with DRX cycle length, so DRX parameters are typically carefully selected such that the packet delay is minimized, and power saving is maximized.

Aspects Related to Dynamic Idle Mode Search and Measurement Scheduling Based on Reference Signal Measurement As noted above, the network (e.g., gNB) typically configures CDRX and the related set of parameters are sent to the UE via radio resource control (RRC) signaling. CDRX mode is beneficial in terms of UE power savings, for example, during sporadic uplink and/or downlink data activity. While in CDRX mode, the UE is subject to CDRX sleep under certain conditions when certain timers related to the DRX-configuration are expired.

There can be many possible concurrent scenarios where a UE might want to renegotiate the 'drx-SlotOffset' for better performance or good power savings.

For example, in E-UTRAN New Radio-Dual Connectivity (EN-DC) non-standalone (NSA) or NR standalone (SA) mode, the network may configure TRS via non zero power (nzp) CSI-resources. Such a TRS configuration is typically provided to the UE via RRC signaling and is used by the UE for frequency tracking loop (FTL) and time tracking loop (TTL) correction.

One of the key parameters of nzp-CSI-resources is a parameter "periodicityAndOffset" which, as the name implies, defines the occasion(s) in the time domain (e.g., a frame/slot) where the network transmits the TRS for the UE to decode for further channel estimation.

Figure 5:
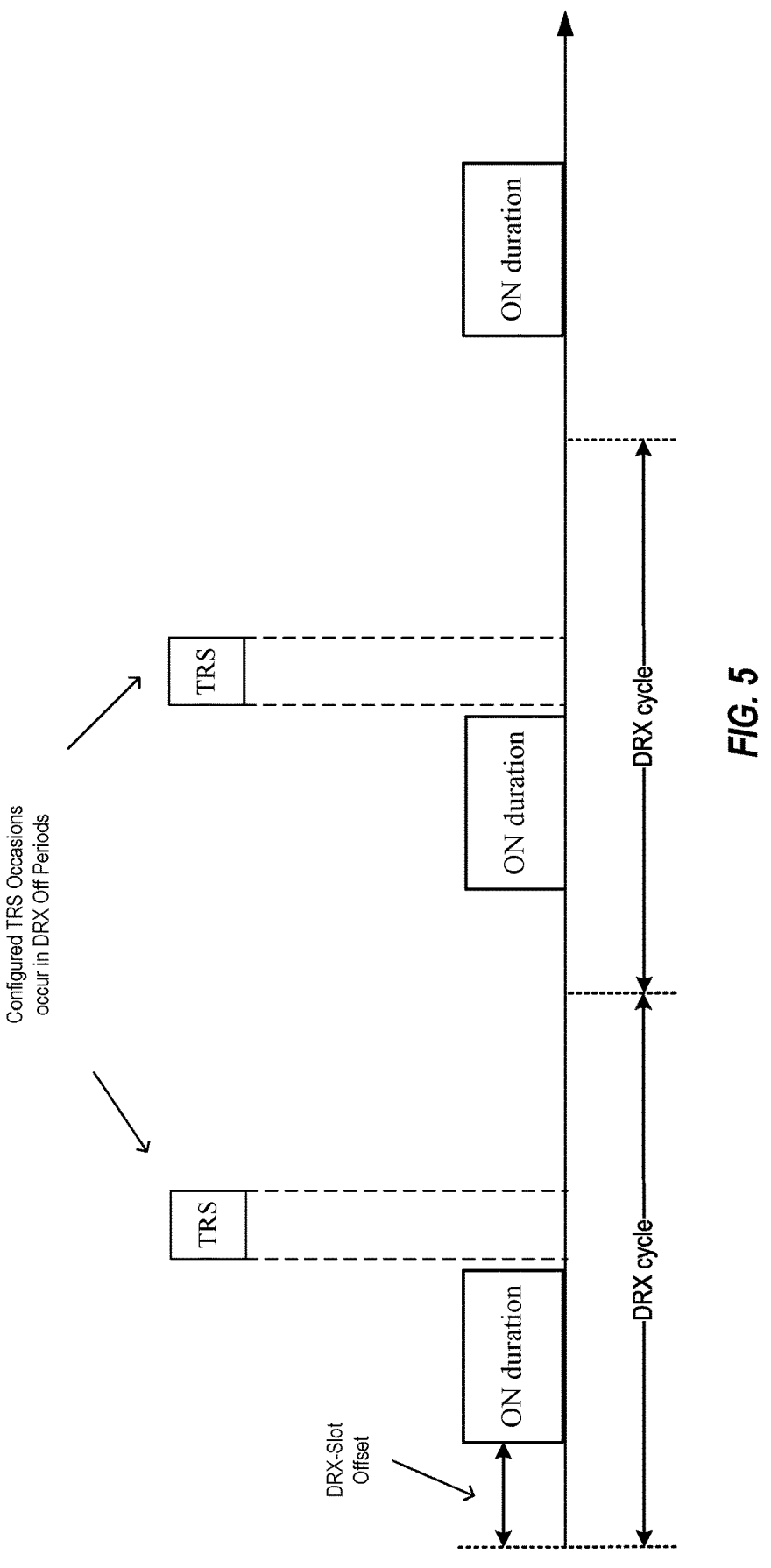
FIG. 5 depicts an example of TRS occasions that fall within discontinuous reception (DRX) OFF durations.

One potential issue with NR-CDRX and TRS configurations is shown in FIG. 5. As illustrated, when NR-CDRX is configured along with TRS, the TRS occasions may be configured in such a way that they fall in the time duration where UE is CDRX sleep state (within configured Off-durations). As a result, in such cases, the UE may need to explicitly wake up for TRS decoding. Thus, TRS decoding may heavily penalize the UE in terms of power consumption if the UE needs to come out (or stay out) of CDRX sleep state to decode TRS signal is an unconfigured (and unwanted) wakeup.

Aspects of the present disclosure, however, provide signaling mechanisms that may allow a UE to effectively negotiate parameters such as the drx-SlotOffset that might help address these scenarios. For example, the techniques proposed herein may allow a UE to negotiate CDRX parameters to effectively align the CDRX On-duration with the downlink reference signal. As a result, the UE may not need to exit CDRX Off-duration prematurely to perform the measurement and UE power savings may be improved.

Signaling mechanisms proposed herein may be understood with reference to the call-flow diagram 600 of FIG. 6.

As illustrated, a network entity (e.g., a gNB) may configured the UE with a DRX configuration. If the UE detects a condition based on the DRX parameters, the UE may send the network entity a request to modify the DRX slot offset. For example, if the original DRX configuration results in TRS occasions falling within configured DRX Off durations, as illustrated in FIG. 5, the UE may request a DRX slot offset that results in the TRS occasions falling within CDRX On durations.

Figure 7:
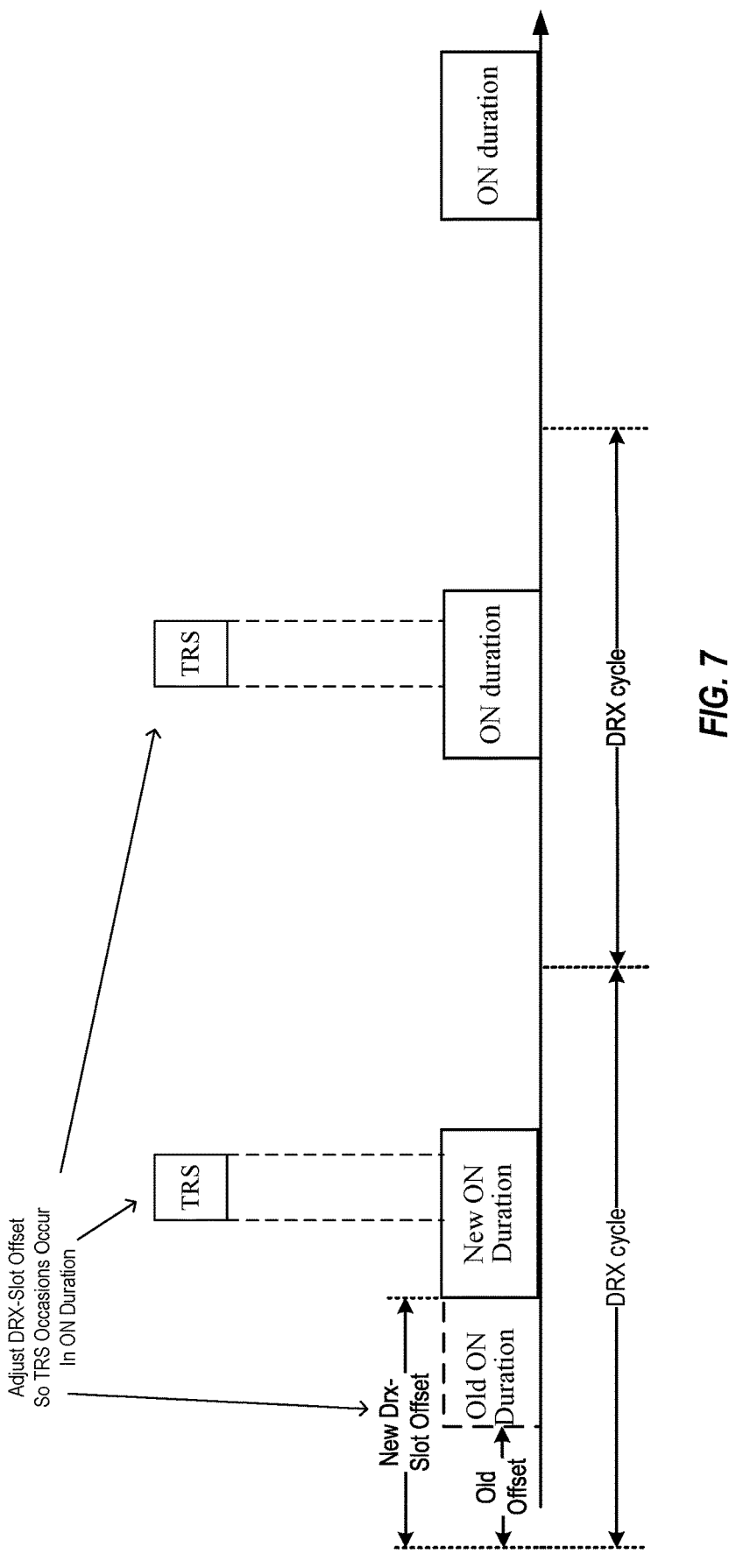
FIG. 7 depicts how negotiated DRX parameters may help ensure that TRS occasions do not fall within DRX OFF durations, in accordance with aspects of the present disclosure.

The network entity may send a response indicating the request is granted. In some cases, the response simply indicates the response was granted. In other cases, the response may explicitly indicate the requested value as a new DRX slot offset value. In either case, the UE may update the DRX slot offset. As illustrated in FIG. 7, the new DRX slot offset value may effectively shift the DRX On-durations, such that the TRS occasions fall within the DRX On-durations. As a result, the UE may not need to prematurely exit a low power state to perform TRS measurements, which may help optimize power savings.

In some cases, a UE may send the request (e.g., that indicates its preferred "drx-SlotOffset") via UE Assistance Information (UAI). In this manner, the network entity may accommodate the same, facilitating the UE to handle the problematic scenarios mentioned above (e.g., a TRS occasion or a SUB2 paging occasion falling in a DRX Off duration).

Thus, aspects of the present disclosure allow a UE to be able to request that the network modify the CDRX wakeup by negotiating the "drx-SlotOffset" in such a manner that the TRS (or any other relevant downlink np-CSI-RS) could be decoded during CDRX wakeup (not during sleep). This approach may also allow the UE to effectively use the CDRX wakeup periods for even better PDSCH reception purposes while, at the same time, improving the UE battery by avoiding unwanted wakeups in CDRx sleep (e.g., to monitor for TRS).

Another potential issue may arise when a device with multiple subscriber identity modules (an MSIM device) is operating in a dual standby dual active (DSDA) mode. In such cases, the UE may have page decoding on a 2nd subscriber unit (SUB2) of a coexisting radio access technology (RAT). For single transceiver (e.g., FR1) devices, performance throughput degradation may be observed on the first SUB (SUB1) due to MSIM tune-aways. In some cases, page performance degradation may be observed on SUB2, for example, based on the channel conditions and time delays associated with tuning away from a first RAT (RAT1) associated with SUB1 and a second RAT (RAT2) associated with SUB2.

Aspects of the present disclosure may allow a UE to negotiate CDRX parameters, such as drx-SlotOffset, in an effort ensure that the page occasions for SUB2 always fall during the CDRx-off period. This approach may prove to be very efficient in terms of UE throughput on SUB1 and page performance on SUB2.

Figure 8:
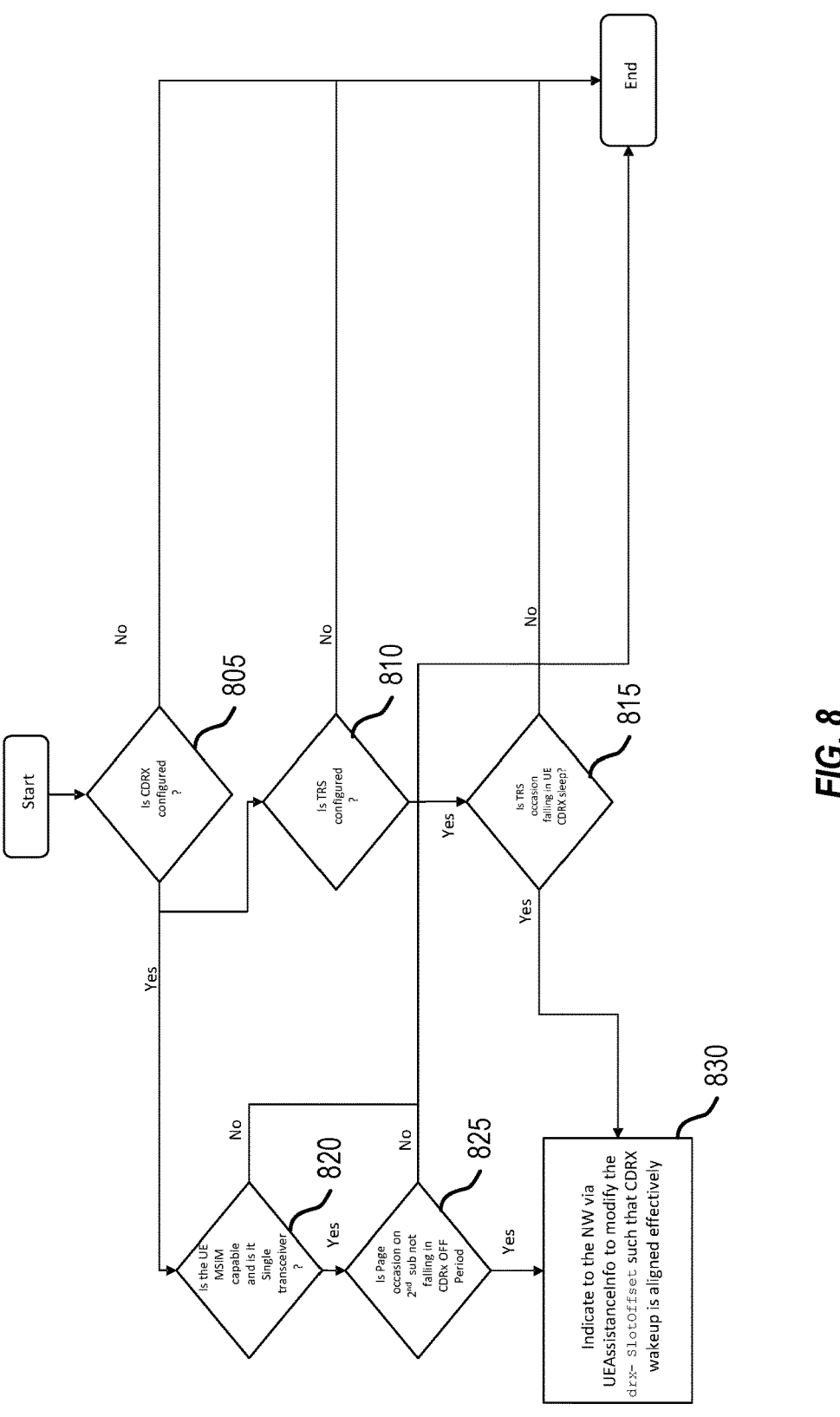
FIG. 8 depicts a flow diagram for negotiating DRX parameters, in accordance with aspects of the present disclosure.

The flow diagram 800 if FIG. 8 depicts a flow diagram for UE operation to address both of the issues described above, where TRS occasions or SUB2 paging occasions fall in a DRX Off duration.

Operations 800 begin, at 805, by determining if CDRX is configured. If so, the UE determines, at 810, whether TRX is configure. If so, the UE determines, at 815, if the TRS occasion(s) fall within a CDRX off duration. If so, at 830, the UE indicates a new value of the DRX-slot-offset, such that the CDRX on durations are aligned effectively.

If the UE is MSIM capable and with a single transceiver, as determined at 820, and the UE determines that its page occasion on SUB2 falls within the DRX Off period, at 825, then the UE indicates (at 830) a new value of the DRX-slot-offset, such that the CDRX on durations are aligned effectively.

Example Methods

FIG. 9 shows an example of a method 900 for wireless communication according to aspects of the present disclosure. In some aspects, a user equipment, such as UE 104 of FIGS. 1 and 2, or processing system 1105 of FIG. 11, may perform the method 900.

Method 900 begins at step 905 with receiving, from a network entity, signaling configuring the UE with DRX parameters for a DRX mode, the DRX parameters including a DRX periodicity and DRX slot offset that define DRX off durations. In some cases, the operations of this step refer to, or may be performed by, DRX configuration circuitry as described with reference to FIG. 11.

Method 900 then proceeds to step 910 with transmitting, to the network entity, a request to modify the DRX slot offset after detecting at least one condition based on the DRX parameters. In some cases, the operations of this step refer to, or may be performed by, DRX parameter modification circuitry as described with reference to FIG. 11.

In some aspects, the request is transmitted via UAI. In some aspects, the method 900 further includes receiving, from the network entity, a response to the request indicating the request is granted. In some aspects, the method 900 further includes updating the DRX slot offset to a value indicated in the request, based on the response.

In some aspects, the at least one condition comprises at least one type of configured RS occasions occurring during the DRX off durations defined by the DRX periodicity and DRX slot offset. In some aspects, the request to modify the DRX slot offset indicates a value of the DRX slot offset designed to move the DRX off durations so the configured RS occasions occur outside the DRX off durations. In some aspects, the configured RS occasions comprise TRS occasions. In some aspects, the method 900 further includes detecting that the configured RS occasions occur during the DRX off durations based on one or more parameters of a RS configuration that indicate a periodicity and offset of the RS occasions.

In some aspects, the UE is operating in a multi SIM mode with at least a first SUB and a second SUB. In some aspects, the at least one condition comprises one or more paging occasions for the second SUB occurring during DRX on durations defined by the DRX periodicity and DRX slot offset. In some aspects, the request to modify the DRX slot offset indicates a value of the DRX slot offset designed to move the DRX off durations so paging occasions for the second SUB occur during DRX off durations defined by the DRX periodicity and DRX slot offset. In some aspects, the at least one condition further comprises at least one type of configured RS occasions occurring during the DRX off durations defined by the DRX periodicity and DRX slot offset. In some aspects, the request to modify the DRX slot offset indicates a value of the DRX slot offset also designed to move the DRX off durations so the configured RS occasions occur outside the DRX off durations.

Figure 10:
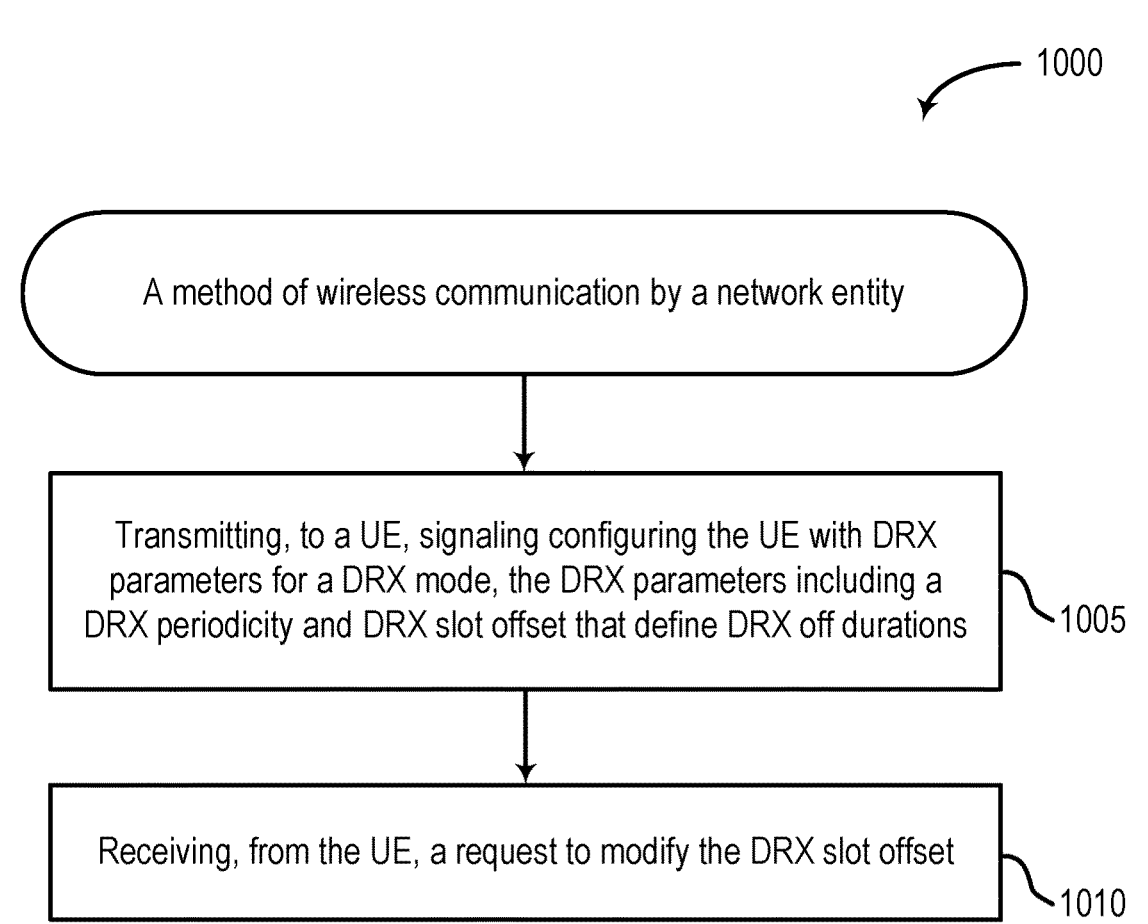

FIG. 10 shows an example of a method 1000 for wireless communication according to aspects of the present disclosure. In some aspects, a base station, such as BS 102 of FIGS. 1 and 2, or processing system 1205 of FIG. 12, may perform the method 1000.

Method 1000 begins at step 1005 with transmitting, to a UE, signaling configuring the UE with DRX parameters for a DRX mode, the DRX parameters including a DRX periodicity and DRX slot offset that define DRX off durations. In some cases, the operations of this step refer to, or may be performed by, DRX parameter configuration circuitry as described with reference to FIG. 12.

Method 1000 then proceeds to step 1010 with receiving, from the UE, a request to modify the DRX slot offset. In some cases, the operations of this step refer to, or may be performed by, DRX modification request circuitry as described with reference to FIG. 12.

In some aspects, the request is received via UAI. In some aspects, the method 1000 further includes transmitting, to the UE, a response indicating the request is granted.

Example Wireless Communication Device

Figure 11:
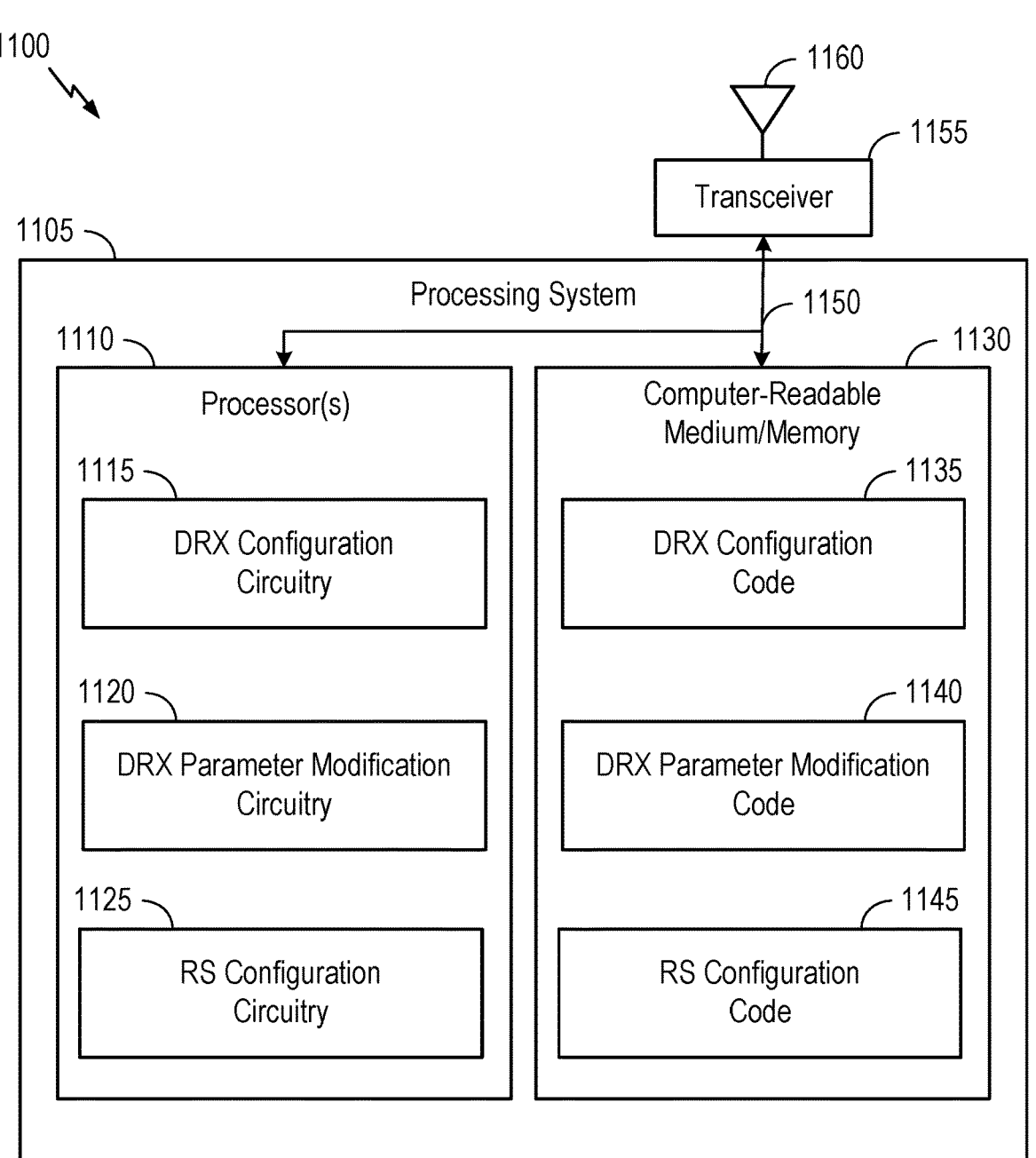
FIGS. 11 and 12 depict example communication devices according to aspects of the present disclosure.

FIG. 11 depicts an example communications device 1100 that includes various components operable, configured, or adapted to perform operations for the techniques disclosed herein, such as the operations depicted and described with respect to FIGS. 8-9. In some examples, communication device 1100 may be a UE 104 as described, for example with respect to FIGS. 1 and 2.

Communications device 1100 includes a processing system 1105 coupled to the transceiver 1155 (e.g., a transmitter and/or a receiver). The transceiver 1155 is configured to transmit (or send) and receive signals for the communications device 1100 via the antenna 1160, such as the various signals as described herein. The transceiver 1155 may communicate bi-directionally, via the antennas 1160, wired links, or wireless links as described herein. For example, the transceiver 1155 may represent a wireless transceiver and may communicate bi-directionally with another wireless transceiver. The transceiver 1155 may also include or be connected to a modem to modulate the packets and provide the modulated packets to for transmission, and to demodulate received packets. In some examples, the transceiver 1155 may be tuned to operate at specified frequencies. For example, a modem can configure the transceiver 1155 to operate at a specified frequency and power level based on the communication protocol used by the modem.

Processing system 1105 may be configured to perform processing functions for communications device 1100, including processing signals received and/or to be transmitted by communications device 1100. Processing system 1105 includes one or more processors 1110 coupled to a computer-readable medium/memory 1130 via a bus 1150.

In some examples, one or more processors 1110 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1110 are configured to operate a memory array using a memory controller. In other cases, a memory controller is integrated into the one or more processors 1110. In some cases, the one or more processors 1110 are configured to execute computer-readable instructions stored in a memory to perform various functions. In some aspects, one or more processors 1110 include special purpose components for modem processing, baseband processing, digital signal processing, or transmission processing.

In certain aspects, computer-readable medium/memory 1130 is configured to store instructions (e.g., computer-executable code) that when executed by the one or more processors 1110, cause the one or more processors 1110 to perform the operations illustrated in FIGS. 8-9, or other operations for performing the various techniques discussed herein.

In one aspect, computer-readable medium/memory 1130 includes DRX configuration code 1135, DRX parameter modification code 1140, and RS configuration code 1145.

Examples of a computer-readable medium/memory 1130 include random access memory (RAM), read-only memory (ROM), solid-state memory, a hard drive, a hard disk drive, etc. In some examples, computer-readable medium/memory 1130 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1100 may provide means for performing the methods described herein, including with respect to FIGS. 8-9.

In some examples, means for transmitting or sending (or means for outputting for transmission) may include transceivers 254 and/or antenna(s) 252 of the UE 104 illustrated in FIG. 2 and/or the transceiver 1155 and the antenna 1160 of the communication device in FIG. 11.

In some examples, means for receiving (or means for obtaining) may include transceivers 254 and/or antenna(s) 252 of the UE 104 illustrated in FIG. 2 and/or the transceiver 1155 and the antenna 1160 of the communication device in FIG. 11.

In some examples, means for updating and/or means for detecting may include various processing system 1105 components, such as: the one or more processors 1110 in FIG. 11, or aspects of the UE 104 depicted in FIG. 2, including receive processor 258, transmit processor 264, TX MIMO processor 266, and/or controller/processor 280 (including DRX processing component 281).

In one aspect, one or more processors 1110 includes DRX configuration circuitry 1115, DRX parameter modification circuitry 1120, and RS configuration circuitry 1125.

According to some aspects, DRX configuration circuitry 1115 receives, from a network entity, signaling configuring the UE with DRX parameters for a DRX mode, the DRX parameters including a DRX periodicity and DRX slot offset that define DRX off durations. According to some aspects, DRX parameter modification circuitry 1120 transmits, to the network entity, a request to modify the DRX slot offset after detecting at least one condition based on the DRX parameters.

In some aspects, the request is transmitted via UAI. In some examples, DRX parameter modification circuitry 1120 receives, from the network entity, a response to the request indicating the request is granted. In some examples, DRX configuration circuitry 1115 updates the DRX slot offset to a value indicated in the request, based on the response.

In some aspects, the at least one condition comprises at least one type of configured RS occasions occurring during the DRX off durations defined by the DRX periodicity and DRX slot offset. In some aspects, the request to modify the DRX slot offset indicates a value of the DRX slot offset designed to move the DRX off durations so the configured RS occasions occur outside the DRX off durations. In some aspects, the configured RS occasions comprise TRS occasions. According to some aspects, RS configuration circuitry 1125 detects that the configured RS occasions occur during the DRX off durations based on one or more parameters of a RS configuration that indicate a periodicity and offset of the RS occasions.

In some aspects, the UE is operating in a multi SIM mode with at least a first SUB and a second SUB. In some aspects, the at least one condition comprises one or more paging occasions for the second SUB occurring during DRX on durations defined by the DRX periodicity and DRX slot offset. In some aspects, the request to modify the DRX slot offset indicates a value of the DRX slot offset designed to move the DRX off durations so paging occasions for the second SUB occur during DRX off durations defined by the DRX periodicity and DRX slot offset. In some aspects, the at least one condition further comprises at least one type of configured RS occasions occurring during the DRX off durations defined by the DRX periodicity and DRX slot offset. In some aspects, the request to modify the DRX slot offset indicates a value of the DRX slot offset also designed to move the DRX off durations so the configured RS occasions occur outside the DRX off durations.

Notably, FIG. 11 is just one example, and many other examples and configurations of communication device are possible.

Figure 12:
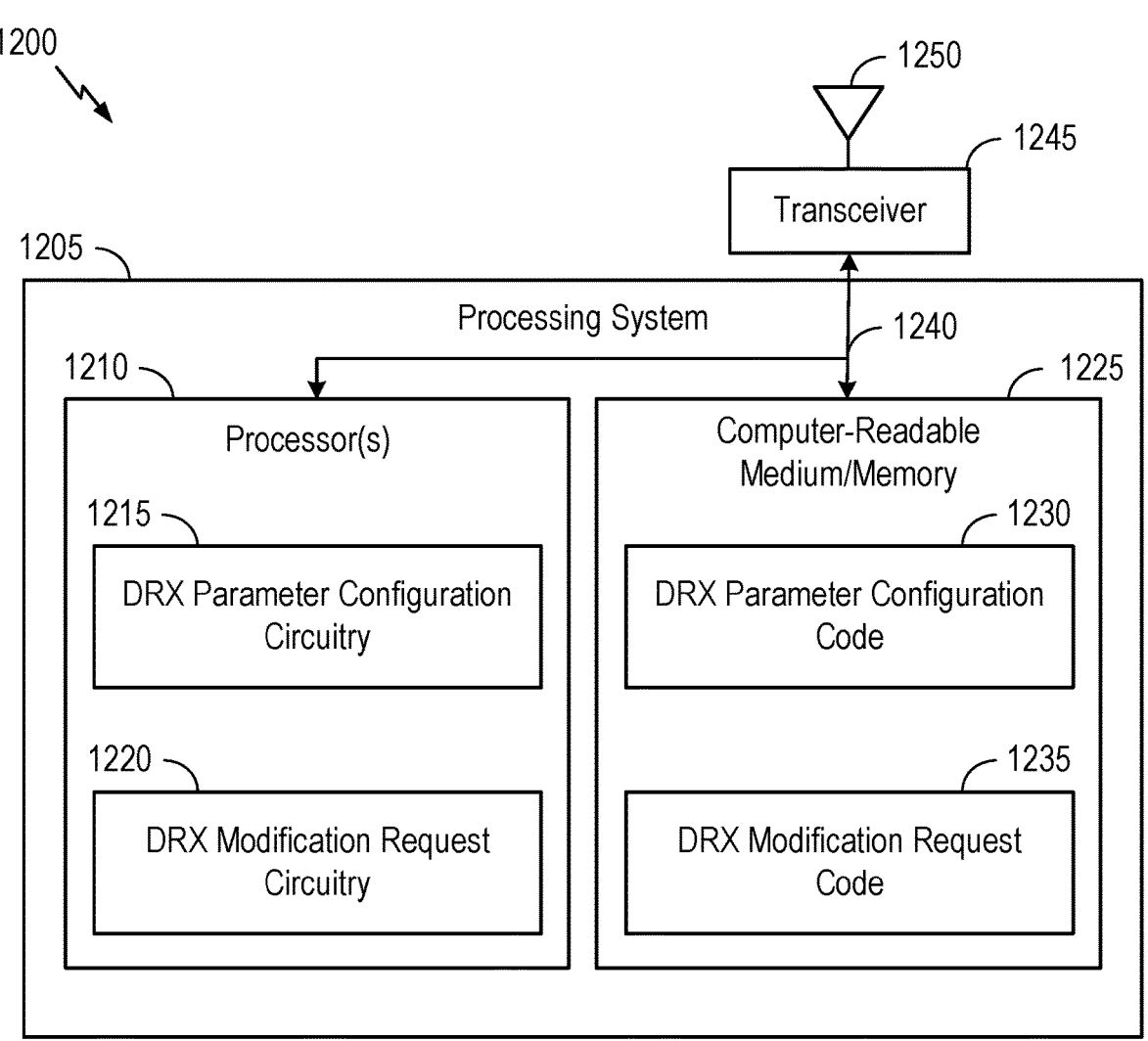

FIG. 12 depicts an example communications device 1200 that includes various components operable, configured, or adapted to perform operations for the techniques disclosed herein, such as the operations depicted and described with respect to FIG. 10. In some examples, communication device may be a BS 102 as described, for example with respect to FIGS. 1 and 2.

Communications device 1200 includes a processing system 1205 coupled to the transceiver 1245 (e.g., a transmitter and/or a receiver). The transceiver 1245 is configured to transmit (or send) and receive signals for the communications device 1200 via the antenna 1250, such as the various signals as described herein. The transceiver 1245 may communicate bi-directionally, via the antennas 1250, wired links, or wireless links as described herein. For example, the transceiver 1245 may represent a wireless transceiver and may communicate bi-directionally with another wireless transceiver. The transceiver 1245 may also include or be connected to a modem to modulate the packets and provide the modulated packets to for transmission, and to demodulate received packets. In some examples, the transceiver 1245 may be tuned to operate at specified frequencies. For example, a modem can configure the transceiver 1245 to operate at a specified frequency and power level based on the communication protocol used by the modem.

Processing system 1205 may be configured to perform processing functions for communications device 1200, including processing signals received and/or to be transmitted by communications device 1200. Processing system 1205 includes one or more processors 1210 coupled to a computer-readable medium/memory 1225 via a bus 1240.

In some examples, one or more processors 1210 may include one or more intelligent hardware devices, (e.g., a general-purpose processing component, a DSP, a CPU, a GPU, a microcontroller, an ASIC, a FPGA, a programmable logic device, a discrete gate or transistor logic component, a discrete hardware component, or any combination thereof). In some cases, the one or more processors 1210 are configured to operate a memory array using a memory controller. In other cases, a memory controller is integrated into the one or more processors 1210. In some cases, the one or more processors 1210 are configured to execute computer-readable instructions stored in a memory to perform various functions. In some aspects, one or more processors 1210 include special purpose components for modem processing, baseband processing, digital signal processing, or transmission processing.

In certain aspects, computer-readable medium/memory 1225 is configured to store instructions (e.g., computer-executable code) that when executed by the one or more processors 1210, cause the one or more processors 1210 to perform the operations illustrated in FIG. 10, or other operations for performing the various techniques discussed herein.

In one aspect, computer-readable medium/memory 1225 includes DRX parameter configuration code 1230 and DRX modification request code 1235.

Examples of a computer-readable medium/memory 1225 include RAM, ROM, solid-state memory, a hard drive, a hard disk drive, etc. In some examples, computer-readable medium/memory 1225 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1200 may provide means for performing the methods described herein, including with respect to FIG. 10.

In some examples, means for transmitting or sending (or means for outputting for transmission) may include transceivers 232 and/or antenna(s) 234 of the BS 102 illustrated in FIG. 2 and/or the transceiver 1245 and the antenna 1250 of the communication device in FIG. 12.

In some examples, means for receiving (or means for obtaining) may include transceivers 232 and/or antenna(s) 234 of the BS 102 illustrated in FIG. 2 and/or the transceiver 1245 and the antenna 1250 of the communication device in FIG. 12.

In some examples, means for transmitting and/or receiving may include various processing system 1205 components, such as: the one or more processors 1210 in FIG. 12, or aspects of the BS 102 depicted in FIG. 2, including receive processor 238, transmit processor 220, TX MIMO processor 230, and/or controller/processor 240 (including DRX processing component 241).

In one aspect, one or more processors 1210 includes DRX parameter configuration circuitry 1215 and DRX modification request circuitry 1220.

According to some aspects, DRX parameter configuration circuitry 1215 transmits, to a UE, signaling configuring the UE with DRX parameters for a DRX mode, the DRX parameters including a DRX periodicity and DRX slot offset that define DRX off durations. According to some aspects, DRX modification request circuitry 1220 receives, from the UE, a request to modify the DRX slot offset.

In some aspects, the request is received via UAI. In some examples, DRX modification request circuitry 1220 transmits, to the UE, a response indicating the request is granted.

Notably, FIG. 12 is just one example, and many other examples and configurations of communication device are possible.

Example Clauses

Implementation examples are described in the following numbered clauses:

Clause 1: A method of wireless communication by a UE, the method comprising: receiving, from a network entity, signaling configuring the UE with DRX parameters for a DRX mode, the DRX parameters including a DRX periodicity and DRX slot offset that define DRX off durations; and transmitting, to the network entity, a request to modify the DRX slot offset after detecting at least one condition based on the DRX parameters.

Clause 2: The method of Clause 1, wherein the request is transmitted via UAI.

Clause 3: The method of any one of Clauses 1 and 2, further comprising: receiving, from the network entity, a response to the request indicating the request is granted; and updating the DRX slot offset to a value indicated in the request, based on the response.

Clause 4: The method of any one of Clauses 1-3, wherein the at least one condition comprises at least one type of configured RS occasions occurring during the DRX off durations defined by the DRX periodicity and DRX slot offset.

Clause 5: The method of Clause 4, wherein the request to modify the DRX slot offset indicates a value of the DRX slot offset designed to move the DRX off durations so the configured RS occasions occur outside the DRX off durations.

Clause 6: The method of Clause 4, wherein the configured RS occasions comprise TRS occasions.

Clause 7: The method of Clause 4, further comprising: detecting that the configured RS occasions occur during the DRX off durations based on one or more parameters of a RS configuration that indicate a periodicity and offset of the RS occasions.

Clause 8: The method of any one of Clauses 1-7, wherein the UE is operating in a multi SIM mode with at least a first SUB and a second SUB; and the at least one condition comprises one or more paging occasions for the second SUB occurring during DRX on durations defined by the DRX periodicity and DRX slot offset.

Clause 9: The method of Clause 8, wherein the request to modify the DRX slot offset indicates a value of the DRX slot offset designed to move the DRX off durations so paging occasions for the second SUB occur during DRX off durations defined by the DRX periodicity and DRX slot offset.

Clause 10: The method of Clause 8, wherein the at least one condition further comprises at least one type of configured RS occasions occurring during the DRX off durations defined by the DRX periodicity and DRX slot offset; and the request to modify the DRX slot offset indicates a value of the DRX slot offset also designed to move the DRX off durations so the configured RS occasions occur outside the DRX off durations.

Clause 11: A method of wireless communication by a network entity, the method comprising: transmitting, to a UE, signaling configuring the UE with DRX parameters for a DRX mode, the DRX parameters including a DRX periodicity and DRX slot offset that define DRX off durations; and receiving, from the UE, a request to modify the DRX slot offset.

Clause 12: The method of Clause 11, wherein the request is received via UAI.

Clause 13: The method of any one of Clauses 11 and 12, further comprising: transmitting, to the UE, a response indicating the request is granted.

Clause 14: A processing system, comprising: a memory comprising computer-executable instructions; one or more processors configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium comprising computer-executable instructions that, when executed by one or more processors of a processing system, cause the processing system to perform a method in accordance with any one of Clauses 1-13.

Clause 17: A computer program product embodied on a computer-readable storage medium comprising code for performing a method in accordance with any one of Clauses 1-13.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a PSSCH, and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a PSSCH.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH DMRS, and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a RB, may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a RB (also referred to as physical RBs (PRBs)) that extends 12 consecutive subcarriers. The resource grid is divided into multiple REs. The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of enhancing UE power savings in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), the method comprising:

receiving, from a network entity, signaling configuring the UE with discontinuous reception (DRX) parameters for a DRX mode, the DRX parameters including a DRX slot offset that indicates a start of a DRX on duration relative to a subframe boundary and a DRX periodicity, wherein the DRX parameters define DRX on durations and DRX off durations; and transmitting, to the network entity, a request to modify the DRX slot offset, the request indicating a requested DRX slot offset value, wherein the transmitting the request is in response to detecting at least one condition based on the DRX parameters, and wherein the at least one condition comprises at least one type of configured reference signal (RS) occasions occurring during the DRX off durations defined by the DRX periodicity and DRX slot offset.

2. The method of claim 1, wherein the request is transmitted via UE assistance information (UAI).

3. The method of claim 2, further comprising detecting that the configured RS occasions occur during the DRX off durations based on one or more parameters of a RS configuration that indicate a periodicity and offset of the configured RS occasions.

4. The method of claim 1, further comprising:

receiving, from the network entity, a response to the request indicating the request is granted; and updating the DRX slot offset to the requested DRX slot offset value indicated in the request, based on the response.

5. The method of claim 1, wherein the requested DRX slot offset value comprises a DRX slot offset that moves the DRX off durations so the configured RS occasions occur outside the DRX off durations.

6. The method of claim 1, wherein the configured RS occasions comprise tracking reference signal (TRS) occasions.

7. The method of claim 1, wherein:

the UE is operating in a multi subscriber identity module (SIM) mode with at least a first subscriber (SUB) and a second SUB; and the at least one condition further comprises one or more paging occasions for the second SUB occurring during DRX on durations defined by the DRX periodicity and DRX slot offset.

8. The method of claim 7, wherein the requested DRX slot offset value comprises a DRX slot offset that moves the DRX off durations so paging occasions for the second SUB occur during DRX off durations defined by the DRX periodicity and DRX slot offset.

9. The method of claim 7, wherein:

the at least one condition further comprises at least one type of configured reference signal (RS) occasions occurring during the DRX off durations defined by the DRX periodicity and DRX slot offset; and the requested DRX slot offset value comprises a DRX slot offset that further moves the DRX off durations so the configured RS occasions occur outside the DRX off durations.

10. A method for wireless communication by a base station, the method comprising:

transmitting, to a user equipment (UE), signaling configuring the UE with discontinuous reception (DRX) parameters for a DRX mode, the DRX parameters including a DRX slot offset that indicates a start of a DRX on duration relative to a subframe boundary and a DRX periodicity, wherein the DRX parameters define DRX on durations and DRX off durations;

configuring the UE with one or more reference signal (RS) occasions occurring during the DRX off durations defined by the DRX periodicity and DRX slot offset; and receiving, from the UE, a request to modify the DRX slot offset of the DRX parameters, the request indicating a requested DRX slot offset value, wherein the receiving, from the UE, the request to modify the DRX slot offset of the DRX parameters is in response to the configuring the UE with the one or more RS occasions.

11. The method of claim 10, wherein the request is received via UE assistance information (UAI).

12. The method of claim 10, further comprising transmitting, to the UE, a response indicating the request is granted.

13. A user equipment (UE) configured for wireless communication, the UE comprising:

memory comprising computer-executable instructions; and one or more processors configured to, individually or collectively, execute the computer-executable instructions and cause the UE to:

receive, from a network entity, signaling configuring the UE with discontinuous reception (DRX) parameters for a DRX mode, the DRX parameters including a DRX slot offset that indicates a start of a DRX on duration relative to a subframe boundary and a DRX periodicity, wherein the DRX parameters define DRX on durations and DRX off durations; and transmit, to the network entity, a request to modify the DRX slot offset, the request indicating a requested DRX slot offset value, wherein the transmitting the request is in response to detecting at least one condition based on the DRX parameters, and wherein the at least one condition comprises at least one type of configured reference signal (RS) occasions occurring during the DRX off durations defined by the DRX periodicity and DRX slot offset.

14. The UE of claim 13, wherein the request is transmitted via UE assistance information (UAI).

15. The UE of claim 13, wherein the one or more processors are configured to, individually or collectively, execute the computer-executable instructions and further cause the UE to:

receive, from the network entity, a response to the request indicating the request is granted; and update the DRX slot offset to the requested DRX slot offset indicated in the request, based on the response.

16. The UE of claim 13, wherein the requested DRX slot offset value comprises a DRX slot offset that moves the DRX off durations so the configured RS occasions occur outside the DRX off durations.

17. The UE of claim 13, wherein the configured RS occasions comprise tracking reference signal (TRS) occasions.

18. The UE of claim 13, wherein the one or more processors are configured to, individually or collectively, execute the computer-executable instructions and further cause the UE to detect that the configured RS occasions occur during the DRX off durations based on one or more parameters of a RS configuration that indicate a periodicity and offset of the configured RS occasions.

19. The UE of claim 13, wherein:

the UE is operating in a multi subscriber identity module (SIM) mode with at least a first subscriber (SUB) and a second SUB; and the at least one condition further comprises one or more paging occasions for the second SUB occurring during DRX on durations defined by the DRX periodicity and DRX slot offset.

20. The UE of claim 19, wherein the requested DRX slot offset value comprises a DRX slot offset that moves the DRX off durations so paging occasions for the second SUB occur during DRX off durations defined by the DRX periodicity and DRX slot offset.

21. The UE of claim 19, wherein:

the at least one condition further comprises at least one type of configured reference signal (RS) occasions occurring during the DRX off durations defined by the DRX periodicity and DRX slot offset; and the requested DRX slot offset value comprises a DRX slot offset that further moves the DRX off durations so the configured RS occasions occur outside the DRX off durations.

22. A base station configured for wireless communication, the base station comprising:

memory comprising computer-executable instructions; and one or more processors configured to, individually or collectively, execute the computer-executable instructions and cause the base station to:

transmit, to a user equipment (UE), signaling configuring the UE with discontinuous reception (DRX) parameters for a DRX mode, a DRX slot offset that indicates a start of a DRX on duration relative to a subframe boundary and a DRX periodicity, wherein the DRX parameters define DRX on durations and DRX off durations;

configure the UE with one or more reference signal (RS) occasions occurring during the DRX off durations defined by the DRX periodicity and DRX slot offset; and receive, from the UE in response to the configuring the one or more RS occasions, a request to modify the DRX slot offset of the DRX parameters, the request indicating a requested DRX slot offset value.

23. The base station of claim 22, wherein the request is received via UE assistance information (UAI).

24. The base station of claim 22, wherein the one or more processors are configured to, individually or collectively, execute the computer-executable instructions and further cause the UE to transmit, to the UE, a response indicating the request is granted.

* * * * *